United States Patent Office 3,843,466
Patented Oct. 22, 1974

3,843,466
METHOD OF PRODUCING DICARBOXYLIC ACIDS
BY FERMENTATION
Shiro Akabori, Tokyo, Isamu Shiio, Kamakura, and Ryosuke Uchio, Yokohama, Japan, assignors to Ajinomoto Co., Inc., Tokyo, Japan
No Drawing. Continuation of application Ser. No. 215,417, Jan. 4, 1972, which is a continuation-in-part of application Ser. No. 87,309, Nov. 5, 1970, both now abandoned. This application Oct. 5, 1973, Ser. No. 403,924
Claims priority, application Japan, Nov. 10, 1969, 44/89,959
Int. Cl. C12b 1/00
U.S. Cl. 195—28 R  6 Claims

ABSTRACT OF THE DISCLOSURE

Certain yeasts of genera Candida and Pichia produce α,ω-n-alkanedioic acids having 5 to 18 carbon atoms by enzymatic oxidation of aliphatic hydrocarbons and their ω- and α,ω-derivatives which are alcohols, aldehydes, or monocarboxylic acids.

---

This is a continuation of application Ser. No. 215,417, filed on Jan. 4, 1972, and now abandoned, which itself is a continuation-in-part of application Ser. No. 87,309, filed on Nov. 5, 1970, and now abandoned.

This invention relates to a method of producing dicarboxylic acids having 5 to 18 carbon atoms from saturated or unsaturated hydrocarbons and certain oxygen-bearing derivatives of the hydrocarbons having straight chains of 9 to 18 carbon atoms.

Dicarboxylic acids having long carbon chains are useful raw materials for the preparation of synthetic resins (polyamides, alkyds, polyesters), lubricating oils, paint vehicles, and the like. However, the production of dicarboxylic acids having 12 to 18 carbon atoms on an industrial scale from simple organic compounds has never succeeded heretofore.

It has now been found that yeasts of the genera Candida and Pichia can produce α,ω-dicarboxylic acids having 5 to 18 carbon atoms in a very high yield from saturated or unsaturated hydrocarbons, aldehydes, alcohols or monocarboxylic acids having straight chains of 9 to 18 carbon atoms under aerobic conditions.

Suitable microorganisms are identified below by accession numbers (FERM P) of the Fermentation Research Institute, the Agency of Industrial Science and Technology, the Ministry of Industrial Trade and Industry, Inage-shi, Japan, in whose culture collection the microorganisms have been deposited and from which they are available upon request:

Candida cloacae AJ–5341 (FERM P–410)
Candida cloacae AJ–5463 (FERM P–736)
Candida tropicalis AJ–5340 (FERM P–734)
Candida maltosa AJ–4718 (FERM P–733)
Candida lipolytica AJ–4546 (FERM P–731)
Candida parapsilosis AJ–4578 (FERM P–408)
Candida intermedia AJ–4625 (FERM P–732)
Candida intermedia AJ–4626
Candida guilliermondii AJ–4532 (FERM P–730)
Pichia haplophila AJ–5078 (FERM P–409)
Pichia etchellsii AJ–5342 (FERM P–735)

The two first-mentioned strains of Candida cloacae, AJ–5341 and AJ–5463, were newly isolated and identified as Candida cloacae by comparison of their characteristics with those reported for Candida cloacae by Komagata and co-workers (J. Gen. Appl. Microbiology, 10 (1964) 323), but differ from the known strains of Candida cloacae by their inability of assimilating L-sorbose, starch, salicin, and 2-ketogluconic acid. The new strains have the following properties:

1. Microscopic observation (growth in yeast extract-malt extract-glucose broth at 25° C. for 3 days):

Cells are 2.5–6.5μ x 2.0–6.5μ, short oval, and occur singly or in pairs.
Spores: not formed (in Kleyn medium, Wiekerham medium, and yeast extract-malt extract-glucose agar medium).
Mycelia: primitive pseudomycelia are formed (in potato-dextrose-agar medium by Dalmau plate method).

2. Agar colonies (growth in yeast extract-malt extract-glucose broth at 25° C. for 20 days):

A streak culture is pale yellowish white to grayish white, smooth, dull glistening, soft or butyrous and has an entire margin.

3. Ring Formation: positive (in yeast extract-malt extract-glucose broth).

4. Fermentation of carbohydrate:

Fermentation of glucose: positive (weakly and delayed).
Fermentation of galactose, saccharose, maltose, lactose, raffinose, melezitose and trehalose: absent.

5. Assimilation of $KNO_3$: absent.
6. Decomposition of arbutin: negative.
7. Vitamin requirement: biotin is required.
8. Liquefaction of gelatin: not liquefied.
9. Production of starch like compound: absent.
10. Assimilation of carbon compounds:

D-glucose, D-galatose, saccharose, glycerol, maltose, adonitol, D-mannitol, cellobiose, D-sorbitol, trehalose, α-methyl-D-glucoside, melibiose, raffinose, potassium gluconate, melezitose, DL-lactic acid, succinic acid, D-xylose, citric acid and D-ribose are assimilated,
Ethanol, erythritol, lactose, dulcitol, L-sorbose, salicin, calcium 2-ketogluconate, inulin, starch, L-arabinose, inositol, D-arabinose, and L-rhamnose are not assimilated.

The microorganisms are preferably cultured first on a medium containing a principal assimilable carbon source other than the hydrocarbon or its derivative until they reach their highest growth rate. The hydrocarbon or its derivative may then be added to the medium which is incubated until the desired dicarboxylic acid is formed. If so desired, the microbial cells may be harvested from the original medium and transferred to another medium containing the hydrocarbon or its derivative for aerobic oxidation of the substrate by the yeast enzyme.

The substrates suitable for the method of the invention have a straight chain of 9 to 18 carbon atoms which may be saturated or olefinic. The substrate may be a hydrocarbon or it may have one or two terminal methylol or formyl groups, or one terminal carboxyl group. Some of the microorganisms are capable of utilizing such substrates as carbon sources during their growth stage. The compounds are thus of the formula

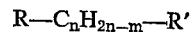

$$R\text{—}C_nH_{2n-m}\text{—}R'$$

wherein R is methyl, methylol, formyl, or carboxyl; R' is methyl, methylol, or formyl; n is an integer between 7 and 16, m is two or zero. The alkanedioic acids produced may have as many as n+2 carbon atoms in their carbon chain.

The culture medium employed should contain sources of assimilable carbon and nitrogen, and the usual essential inorganic salts and minor organic nutrients. The carbon source may be a hydrocarbon, an oxygenated derivative thereof, such as an alcohol, aldehyde, or monocarboxylic acid, or a conventional carbohydrate. Suitable assimilable nitrogen sources include chloride, sulfate, and phosphate of ammonium, the nitrates of potassium and sodium, urea, ammonia in the gaseous state or in aqueous solution, amino acids and proteins. Organic nutrients are exemplified by vitamins, amino acids, nucleic acids, their derivatives and precursors, yeast extract, corn steep liquor, peptone, protein hydrolyzate, animal and vegetal tissues, and the like. The sources of carbon and nitrogen, the inorganic salts, and organic nutrients are employed in the media of the invention in amounts which are entirely conventional in this art.

The fermentation in an ordinary culture medium is preferably carried out at approximately ambient temperature, preferably 20° to 40° C., under aerobic conditions maintained by shaking, aerating, and/or stirring the medium to maintain contact between the hydrocarbon or its oxygen-bearing derivative and the yeast cells. Surface active agents, emulsifying agents, or organic solvents may be added to the medium. The pH of the medium is preferably between 4 and 9, and is maintained by adding alkaline phosphates, potassium or sodium hydroxide, gaseous or aqueous ammonia in the usual manner as the dicarboxylic acid is formed in the medium. The cultivation is usually terminated one to five days after inoculation.

The dicarboxylic acid accumulated in the broth may be recovered by conventional methods such as solvent extraction or adsorption on ion exchange resin. Typically, the water insoluble ingredients, mainly cells and the substrate of the invention, are removed from the broth by filtration or centrifuging, and the dicarboxylic acid is extracted from the filtrate with ether, and isolated by evaporation of the extract.

For determining the dicarboxylic acid in the broth, an aliquot is made alkaline and filtered, the filtrate is acidified and extracted with ether, the acid in the extract is esterified with diazomethane, and the methyl ester so formed is subjected to gas chromatography for identification and for quantitative determination of the acid in the broth.

The following Examples further illustrate the invention.

EXAMPLE 1

A culture medium was prepared by dissolving in water 20 g. $(NH_4)_2HPO_4$, 2 g. $K_2HPO_4$, 0.3 g. $MgSO_4$, 10 mg. $FeSO_4$, 8.2 mg. $MnSO_4$, 8.8 mg. $ZnSO_4$, and 2 g. yeast extract. The solution so obtained was diluted with water to 900 ml. adjusted to pH 7.0, and further mixed with 45 g. sorbitol. It was then inoculated with *Candida cloacae* AJ–5463.

10 ml./dl. n-Hexadecane was added to the medium up to 30 hours after the inoculation as listed in Table 1, and the medium was kept at 30° C. for 48 hours thereafter under aerobic condition. 1N-NaOH Solution was added as needed to keep the pH between 7.0 and 7.5. The amounts of 1,14-tetradecanedicarboxylic acid found in the broth after fermentation are also listed in Table 1.

TABLE 1

| Addition of $C_{16}H_{34}$, hrs. after inoculation | 0 | 8 | 24 | 30 |
|---|---|---|---|---|
| HOOC—$C_{14}H_{28}$—COOH produced, g./l. | 11.8 | 13.4 | 19.6 | 18.7 |

One liter of culture broth containing 19.6 g./dl. 1,14-tetradecanedicarboxylic acid was prepared as described above, mixed with 200 ml. 5N-NaOH, boiled, and filtered to remove the cells. The filtrate was mixed with 100 ml. concentrated hydrochloric acid to precipitate the dicarboxylic acid which was collected by centrifuging and recrystallized from hot ethanol. The crystalline, purified acid weighed 14 g.

EXAMPLE 2

Several 22.5 ml. batches of the same culture medium as in Example 1 were placed in 500 ml. shaking flasks, mixed each with 2 ml. n-dodecane, and sterilized at 115° C. for 10 minutes. The media were then inoculated with respective suspensions of cells of the yeasts listed in Table 2 harvested from a yeast extract-malt extract-agar medium on which they had been cultured for 24 hours at 30° C. The suspensions consisted of $5 \times 10^8$ cells per milliliter and sterile 0.2 g./dl. KCl solution and was used in an amount of 0.5 ml. per inoculum.

The several fermentation broths were adjusted twice daily to 7.0–7.5 with 2N KOH solution and were kept at 30° C. for 72 hours with shaking. The ultimate concentrations of 1,10-decanedicarboxylic acid are also listed in Table 2.

TABLE 2

| Yeast: | 1,10-Decanedicarboxylic acid, mg./l. |
|---|---|
| *Candida cloacae* AJ–5341 | 610 |
| *Candida maltosa* AJ–4718 | 10 |
| *Candida lipolytica* AJ–4546 | 13 |
| *Candida parapsilosis* AJ–4578 | 526 |
| *Candida intermedia* AJ–4626 | 14 |
| *Candida intermedia* AJ–4625 | 98 |
| *Pichia haplophila* AJ–5078 | 21 |

EXAMPLE 3 n-Tridecane was substituted in the general procedure of Example 2 for the n-dodecane, and other yeasts were employed in part, as is evident from Table 3 which also lists the ultimate concentrations of 1,11-undecanedicarboxylic acid.

TABLE 3

| Yeast: | 1,11-Undecanedicarboxylic acid, mg./l. |
|---|---|
| *Candida cloacae* AJ–5341 | 192.3 |
| *Candida maltose* AJ–4718 | 8.4 |
| *Candida parapsilosis* AJ–4578 | 53 |
| *Candida quilliermondii* AJ–4532 | 13 |
| *Candida tropicalis* AJ–5340 | 6 |
| *Pichia etchellsii* AJ–5342 | 8 |
| *Pichia haplophila* AJ–5078 | 10 |

EXAMPLE 4

In the general procedure of Example 2, the hydrocarbons were varied while an inoculum of *Candida parapsilosis* AJ–4578 was employed in each batch. The amounts of $\alpha,\omega$-dialkanoic acids having 12,13,14, and 16 carbon atoms produced 8 ml./dl. of each of the several hydrocarbons or hydrocarbon mixtures are listed in Table 4.

TABLE 4

| Hydrocarbon | $\alpha,\omega$-n-Alkanedioic acid, mg./l. | | | |
|---|---|---|---|---|
| | $C_{12}$ | $C_{13}$ | $C_{14}$ | $C_{16}$ |
| n-Tetradecane | 87 | | 121.3 | |
| n-Pentadecane | | 46.2 | | |
| n-Hexadecane | 18 | | 21 | 1.8 |
| Kerosene | | | 6 | |
| Light oil | 64 | | 17 | 4 |

EXAMPLE 5

900 ml. Culture medium were prepared as in Example 1 and adjusted to pH 7.5. 13.3 ml. Batches were placed in 500 ml. shaking flasks, and 1.2 ml. n-dodecane was added to each flask whose contents were then sterilized. *Candida cloacae* AJ–5341 and *Candida parapsilosis* AJ–4578 were cultured on the aforementioned medium for 48 hours, and the sterilized batches in the flasks were inoculated with the pre-cultured yeasts, and incubated at 30° C. for 72 hours with shaking. Calcium carbonate was added for pH control prior to inoculation in the amounts listed in Table 5 which also shows the ultimate concentrations of adipic acid ($C_6$), suberic acid ($C_8$) and 1,10-decanedicarboxylic acid ($C_{12}$) found in the broths.

TABLE 5

| Yeast | $CaCO_3$, g./dl. | $\alpha$-$\omega$-n-Alkanedioic acid, mg./l. | | |
|---|---|---|---|---|
| | | $C_6$ | $C_8$ | $C_{12}$ |
| *C. cloacae* AJ–5341 | 12 | 1,000 | 1,000 | 1,324.7 |
| Do | 14 | 1,040 | 413 | 1,423.3 |
| *C. parapsilosis* AJ–4578 | 10 | | | 1,946.7 |
| Do | 12 | | | 1,686.6 |

EXAMPLE 6

*Candida cloacae* AJ–5463 was cultered on a medium as in Example 1, containing 5 g./dl. sorbitol, for 24 hours. The cells were harvested and inocula containing each the equivalent of 250 mg. dry matter were added to 13.5 ml. batches of 0.5 M phosphate buffer at pH 7.5 which respectively contained as substrates the hydrocarbons, alcohols, aldehydes, and monocarboxylic acids listed in Table 6 below in amounts of 10 ml./dl. for the hydrocarbons and lauryl alcohol, 3 g./dl. for dodecanediol and 1 g./dl. for all other compounds, $\alpha,\omega$,n-Alkanedioic acids were produced in the several buffer suspensions or solutions as identified by the lengths of their carbon chains after 72 hours at 30° C.

TABLE 6

| Substrate | $\alpha,\omega$-n-Alkanedioic acid, g./l. | |
|---|---|---|
| n-Dodecane | 8.2 $C_{12}$ | 0.60 $C_6$ |
| n-Tridecane | 9.83 $C_{13}$ | |
| n-Tetradecane | 12.4 $C_{14}$ | 0.08 $C_{12}$ |
| n-Pentadecane | 16.9 $C_{15}$ | 0.06 $C_{13}$ |
| n-Hexadecane | 18.46 $C_{16}$ | 0.12 $C_{12}$ |
| n-Heptadecane | 8.24 $C_{17}$ | 0.13 $C_{15}$ |
| n-Octadecane | 6.46 $C_{18}$ | 0.12 $C_{16}$ |
| n-Tetradecene-1 | 2.65 $C_{12}$ | 1.11 $C_{14}$ |
| n-Hexadecene-1 | 4.60 $C_{14}$ | 1.29 $C_{16}$ |
| Lauryl alcohol | 1.12 $C_{12}$ | 0.02 $C_{10}$ |
| Myristyl alcohol | 2.30 $C_{14}$ | 0.19 $C_{12}$ |
| Palmityl alcohol | 0.30 $C_{16}$ | 0.08 $C_8$ |
| Myristic aldehyde | 0.13 $C_{14}$ | 0.04 $C_{12}$ |
| Myristic acid | 0.15 $C_{14}$ | 0.02 $C_{12}$ |
| Palmitic acid | 0.08 $C_{16}$ | 0.01 $C_{14}$ |
| Stearic acid | 0.05 $C_8$ | 0.02 $C_6$ |
| 1,12-dodecanediol | 8.2 $C_{12}$ | 0.09 $C_7$ |
| n-Nonane | 1.98 $C_9$ | 0.09 $C_7$ |
| n-Decane | 3.24 $C_{10}$ | 0.09 $C_8$ |
| n-Undecane | 4.85 $C_{11}$ | 0.16 $C_9$ |

EXAMPLE 7

The procedure of Example 2 was repeated using *Candida cloacae* AJ–5341 only, but varying the n-alkane employed as listed in Table 7 together with the $\alpha,\omega$-n-dicarboxylic acids found in the fermented broths. The acids are identified by their carbon atoms as in Example 6.

TABLE 7

| Substrate | $\alpha,\omega$-n-Alkanedioic acid, mg./l. | | |
|---|---|---|---|
| n-Nonane | $C_5$ 96.3 | $C_6$ 187.3 | $C_9$ 546 |
| n-Decane | $C_6$ 118.7 | $C_8$ 23.7 | $C_{10}$ 426.5 |
| n-Undecane | $C_7$ 78 | $C_9$ 22 | $C_{11}$ 232 |
| n-Dodecane | $C_6$ 98 | $C_8$ 112.6 | $C_{12}$ 610 |
| n-Tridecane | $C_7$ 65.4 | $C_9$ 21.1 | $C_{13}$ 192.3 |
| n-Tetradecane | $C_6$ 28 | $C_8$ 31 | $C_{14}$ 79.4 |
| n-Pentadecane | $C_7$ 186 | $C_9$ 28 | $C_5$ 12 |
| n-Hexadecane | $C_6$ 207 | $C_8$ 70.5 | |
| n-Heptadecane | $C_7$ 176 | $C_9$ 23 | |
| n-Octadecane | $C_6$ 39 | $C_8$ 118.3 | $C_{10}$ 10 |

As is evident from Example 6, the yeasts of the invention are more effective in converting hydrocarbons into the corresponding dialkanoic acids or dialkanoic acids having shorter carbon chains than in converting monofunctional alcohols and aldehydes, and monocarboxylic acids. Unless the oxygen-bearing derivatives happen to be available at particularly attractive cost, the hydrocarbons are preferred, and the saturated compounds normally give higher yields than the compounds having double bonds in their carbon chain. It is further seen from the Tables that the invention is particularly useful in converting compounds having 12 to 18 carbon atoms into the corresponding or shorter-chained $\alpha,\omega$-n-dialkanoic acids.

Useful amounts of the dicarboxylic acids can also be produced from $\alpha,\omega$-difunctional derivatives of straight-chained hydrocarbons having 9 to 18 carbon atoms, but these starting materials are not economically attractive at this time. Thus, 3 g./dl. 1,12-dodecanediol incorporated in the farmentation medium of Example 6 was converted to 8.2 g./l. 1,12-dodecanedioic acid which is available by the same method from much cheaper n-dodecane.

While the invention has been described with particular reference to specific embodiments, it is to be understood that it is not limited thereto, but is to be construed broadly and restricted solely by the scope of the appended claims.

What is claimed is:

1. A method of producing an $\alpha,\omega$-n-alkanedioic acid having a carbon chain of 12 to 18 carbon atoms which comprises:

(a) contacting a compound having a straight carbon chain and the formula

   $$R-C_nH_{2n-m}-R'$$

in an aqueous medium under aerobic conditions with an enzyme of *Candida cloacae* FERM P–736 until said alkanedioic acid is accumulated in said medium; and (b) recovering the accumulated alkanedioic acid from said medium, (1) in said formula R being methyl, methylol, formyl, or carboxyl; R' being methyl, methylol, formyl, or carboxyl; R' being methyl, methylol, or formyl; n being an integer between 10 and 16; and m being two or zero.

2. A method as set forth in claim 1, wherein said compound is an alkane, and the recovered alkanedioic acid has the same number of carbon atoms as said alkane.

3. A method as set forth in claim 1, wherein said yeast is cultured in the presence of said compound in said aqueous medium until said alkanedioic acid is accumulated, said medium containing assimilable sources of carbon and nitrogen and minor nutrients necessary for growth of said yeast.

4. A method as set forth in claim 1, wherein the accumulated alkanedioic acid has a carbon chain of $n+2$ members.

5. A method as set forth in claim 1, wherein R' is methyl.

6. A method as set forth in claim 1, wherein R' is methyl, m is zero.

References Cited

Iizuka et al.: "Candidal Oxidation of Decane," J. Gen. App. Microbiol., Vol. 12, No. 2 (1966), pp. 119–126.

Ogino et al.: "Diterminal Oxidation of Alkanes by Yeasts," Agr. Biol. Chem., Vol. 29, No. 11 (1965), pp. 1009–1015.

Jones et al.: "Microbiological Oxidation of Long Chain Aliphatic Compounds," J. Chem. Soc. C., 1968, pp. 2801–2808.

A. LOUIS MONACELL, Primary Examiner

R. B. PENLAND, Assistant Examiner

U.S. Cl. X.R.

195—37